(12) United States Patent
Anflo et al.

(10) Patent No.: US 7,285,259 B2
(45) Date of Patent: *Oct. 23, 2007

(54) SINTERING RESISTANT CATALYST MATERIAL AND A METHOD FOR THE PREPARATION THEREOF

(75) Inventors: Kjell Anflo, Haninge (SE); Johan Agrell, Täby (SE); Anders Ersson, Bromma (SE); Sven Järås, Täby (SE); Magali Boutonnet, Täby (SE); Jesper Brandt, Falsterbo (SE); Ola Lyckfeldt, Göteborg (SE)

(73) Assignee: ECAPS, Solna (SE)

( * ) Notice: Subject to any disclaimer, the term of this patent is extended or adjusted under 35 U.S.C. 154(b) by 206 days.

This patent is subject to a terminal disclaimer.

(21) Appl. No.: 10/478,406

(22) PCT Filed: May 23, 2002

(86) PCT No.: PCT/SE02/00987

§ 371 (c)(1), (2), (4) Date: Jun. 1, 2004

(87) PCT Pub. No.: WO02/094716

PCT Pub. Date: Nov. 28, 2002

(65) Prior Publication Data

US 2004/0208819 A1    Oct. 21, 2004

(30) Foreign Application Priority Data

May 23, 2001  (SE) ................... 0101847
May 23, 2001  (SE) ................... 0101852

(51) Int. Cl.
*C01F 17/00*    (2006.01)
*C01F 11/00*    (2006.01)
*C01F 5/00*     (2006.01)
*C01F 1/00*     (2006.01)
*C01F 7/02*     (2006.01)

(52) U.S. Cl. ................ 423/263; 423/600; 423/594.16; 423/599; 23/295 R

(58) Field of Classification Search ............... 423/263, 423/600, 594.16, 599; 23/313 R, 295 R
See application file for complete search history.

(56) References Cited

U.S. PATENT DOCUMENTS

| | | | |
|---|---|---|---|
| 4,788,174 A * | 11/1988 | Arai ........................... | 502/324 |
| 6,221,805 B1 | 4/2001 | Yamashita et al. | |
| 6,638,492 B1 * | 10/2003 | Matacotta et al. ....... | 423/437.1 |
| 6,774,080 B2 * | 8/2004 | LaBarge et al. ........... | 502/170 |
| 6,869,584 B2 * | 3/2005 | Ying et al. ................. | 423/600 |
| 2004/0171474 A1 * | 9/2004 | Kobayashi et al. ........ | 501/98.4 |

FOREIGN PATENT DOCUMENTS

JP    7-75735 A  *  3/1995

OTHER PUBLICATIONS

WPI/Derwent's Abstract, Accession No. 1990-251000, week 9033, Abstract of Japan, 2175602, Jul. 6, 1990.

* cited by examiner

*Primary Examiner*—Timothy C. Vanoy
(74) *Attorney, Agent, or Firm*—Browdy and Neimark, PLLC

(57) ABSTRACT

Preparation of sintering resistant hexaaluminates, $AAl_{11}O_{18}$, wherein A is an alka-line earth or rare earth metal, and more particularly lanthanum, by a combination of sol-gel and microemulsion techniques using a water soluble salt of A, and a method of forming spherical pellets thereof are disclosed.

16 Claims, 2 Drawing Sheets

SINTERING RESISTANT CATALYST MATERIAL AND A METHOD FOR THE PREPARATION THEREOF

The present invention relates to the preparation of high-temperature stable hexaaluminates, $AAl_{11}O_{18}$, wherein A is an alkaline earth or rare earth metal, and more particularly lanthanum, by a combination of sol-gel and microemulsion techniques using a water soluble salt of A, and a method of forming spherical pellets thereof.

TECHNICAL FIELD OF THE INVENTION

The space industry is an emerging new market for catalysts. Production volumes are small but the demands for reliability are very high. Hence, novel materials and preparation techniques are under investigation. For novel High Performance Mono-propellants the materials used as ignition catalysts in rocket engines are exposed to harsh conditions and have to withstand high concentrations of steam and extremely high temperatures. Although the total required operating lifetime of the catalyst is usually limited, the extreme environment excludes the use of most common materials.

Hexaaluminates, $AAl_{11}O_{18}$, where A is an alkaline earth or rare earth metal, are a group of materials that are well known for their high resistance to sintering. The crystal structure is comprised of two alumina blocks with a spinel structure, divided by a mirror plane in which the large A-ions are situated. This configuration lowers the diffusion along the c-axis, hence suppressing crystal growth. Once the hexaaluminate crystal is formed, the growth is very slow and the sintering of the material is suppressed. Therefore, the hexaaluminates are promising materials for use at extreme temperatures.

Conventional methods, such as sol-gel and carbonate co-precipitation techniques, have been widely used for preparation of hexaluminate materials. These methods result in a material that is not always sufficiently well mixed before heat treatment. Due to the compositional heterogeneity of the as-synthesised powder; very high temperatures are generally required for crystallisation via solid-state reactions. This leads to a loss of surface area due to severe crystallite growth. Compositional homogeneity is expected to favour formation of the hexaaluminate phase at relatively low temperatures. For this reason, a reverse microemulsion-mediated synthesis route has been suggested by A J. Zarur and J. Y. Ying, *Nature,* 403 (2000) 65.

The microemulsion technique is a versatile preparation method, which enables control of particle properties such as size, geometry, morphology, homogeneity and surface area. In essence, a reverse microemulsion contains nanometer-sized water droplets dispersed in a continuous oil phase. The emulsion is stabilized by surfactant molecules at the water-oil interface. Common water-based chemistry can be carried out in the aqueous domain of the microemulsion, rendering possible synthesis of nano-crystalline materials with an extremely narrow particle size distribution and well-defined geometry. This route has been used successfully for preparation of a wide variety of materials, including metallic colloids and high surface area metal oxides.

The objective of the invention is to improve the sintering resistance of hexaaluminate catalyst materials.

SUMMARY OF INVENTION

The first objective has been achieved by means of the method of claim 1, according to which hexaaluminates, $AAl_{11}O_{18}$, wherein A is an alkaline earth or rare earth metal, having improved sintering resistance are prepared by adding a solution of an aluminium alkoxide to a water-in-oil micro-emulsion, the aqueous phase of which comprises a solution of a water soluble salt of A, whereafter the powder formed is recovered and calcined.

Accordingly, in the present method at least one of the reactants forming the powder is included in the water phase of the micro-emulsion.

It has been found that by including the alkaline earth or rare earth metal in the water phase of the micro-emulsion, improved compositional homogeneity of the powder formed is obtained, thus enabling crystallisation at a lower temperature, suppressing grain growth and leading to a reduced loss of surface area during crystallisation, and thereby a hexaaluminate powder having larger specific surface area.

Furthermore, by means of the inventive method the nano-particles obtained exhibits a very narrow particle size distribution, which is believed to further enhance the obtainable specific surface area of the hexaaluminate.

Since sintering is suppressed, the material will thus exhibit enhanced thermal stability. The surface area of the powder is thus maintained better at high temperatures, even in the presence of water vapour.

The present method is offers a less expensive route to hexaaluminates, since the water soluble metal salts used, and especially the nitrates, generally are much cheaper than the corresponding alkoxides.

The method is also simplified since alkoxides are generally more difficult to handle. Furthermore, the alkoxides will generally have to be added to an organic solvent, since they are not water soluble, such for example the iso-propoxides.

In order to obtain an improved catalytic activity at extremely high temperatures, a portion of the aluminium alkoxide can be substituted by an equimolar amount of a water soluble salt of manganese. The manganese salt is then added to the water phase, together with the water soluble salt of the alkaline earth or rare earth metal.

The method can be used with any water soluble salt, such as chlorides or acetates.

Nitrates are suitably used in the method since the nitrate moiety is easy to strip from the precipitated powder, and are also generally readily available.

The use of a nitrate metal salt in the method also simplifies the substitution of manganese for lanthanum, since manganese nitrate is more readily available, than manganese alkoxides.

The metal salts used should preferably exhibit the same anion.

It is preferred that the solvent for the aluminium alkoxide and the solvent of the oil phase of the microemulsion to the same. More preferably, a solvent is selected which can readily be evaporated for recovery of the powder.

The materials are suitable as catalyst or catalyst support materials. The loss in specific surface area during use of the materials obtained by the present method as high-temperature catalyst materials has been considerably reduced, as compared to the prior art materials.

The incorporation of dopant, such as Mn, into the material will further enhance the catalytic activity and stability of the catalyst material. The material will thus be able to better maintain an active surface at higher temperatures, such as, for example, about 1800° C.

The materials of the present invention can be further processed into granules or other suitably shaped bodies by means of conventional forming techniques.

In another aspect the invention provides a method for forming small, porous, spherical pellets of the inventive material.

BRIEF DESCRIPTION OF THE ATTACHED DRAWINGS

DETAILED DESCRIPTION

Figure 1:
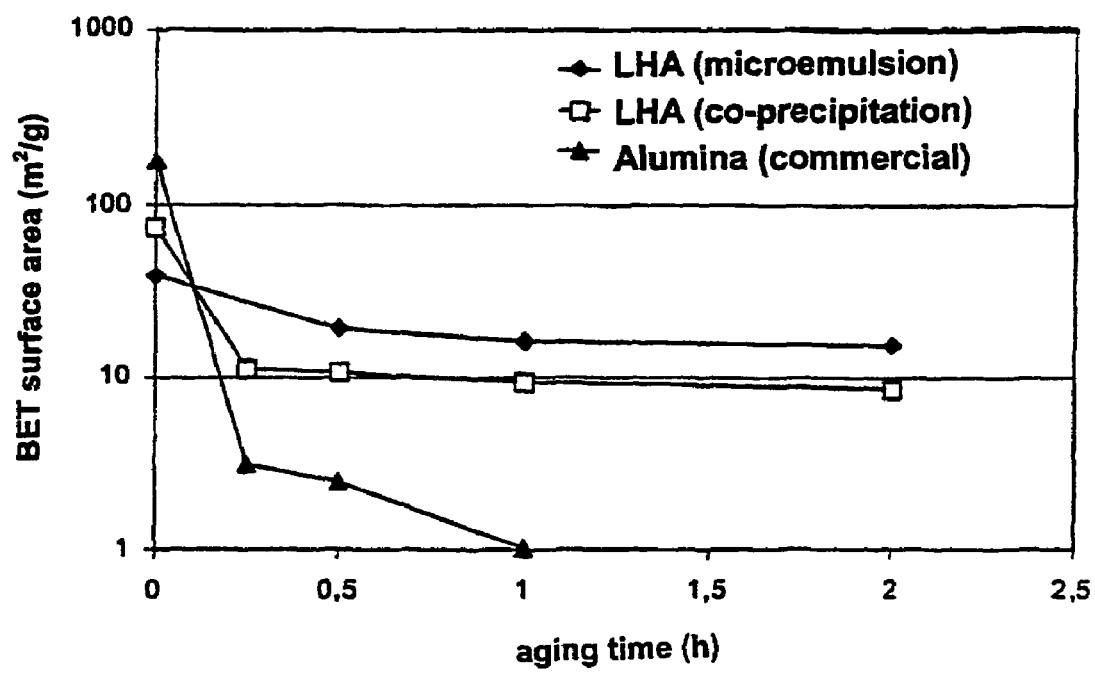
FIG. 1 shows the thermal stability of the LHA materials prepared by combined sol-gel and microemulsion techniques are compared to those of conventionally co-precipitated LHA (co-precipitation of carbonates) and commercial alumina samples.

In order to achieve the object of the present invention, a microemulsion-assisted sol-gel technique has been developed by the present inventors. According to one embodiment of the method, the hexaaluminate can suitably be prepared by hydrolysis of an aluminum iso-propoxide solution, using a microemulsion containing metal nitrates in the aqueous phase. The gel is aged under stirring, during which hydrolysis and condensation occurs. Subsequently, the powder is recovered, dried and calcined.

The sol-gel technique is well-developed for the preparation of high-surface area metal oxides. By combining the sol-gel technique with microemulsion-mediated synthesis, a method has been developed, which enables preparation of a nanostructured hexaaluminate material, and especially LHA, with high-temperature stability and enhanced resistance to sintering compared to hexaaluminate prepared by conventional techniques. A water-in-oil (w/o) microemulsion, sometimes referred to as a reverse microemulsion, contains well-dispersed and nanometer-sized water droplets of a narrow size distribution. The water-oil interface is stabilised by amphiphilic molecules (surfactant molecules). By using the droplets as nanoreactors, conventional water-based chemical reactions can be carried out in a well-defined and confined environment. This is known as microemulsion technique.

By using the microemulsion technique, the composition of the precipitate is controlled not only by the rates of precipitation, but also by the diffusion rate of each reacting component in the solvent phase. This feature, combined with the confined environment provided by the nanodroplets, enables synthesis of nanostructured materials. It is believed that the formation of hexaaluminate crystal structure at lower temperatures is favoured if the precipitate is well-mixed at nanometer level. Nanoparticles generally exhibit high reactivity, due to the high surface/volume ratio. Once the hexaaluminate phase has formed, further crystallite growth is slow, thereby leading to good high-temperature stability. In contrast, when conventional preparation techniques are used, higher temperatures are generally needed for crystallisation, leading to sintering of the material accompanied by loss of surface area.

According to a preferred embodiment of the present invention lanthanum hexaaluminate powder (LHA, $LaA_{11}O_{18}$) is prepared. According to a more preferred embodiment, the method involves the hydrolysis of aluminium iso-propoxide using an aqueous solution of lanthanum nitrate, added in the form of a water-in-oil microemulsion.

The following examples are given for the purpose of illustrating the invention and not to limit the invention thereto.

EXAMPLES 1-3

Powder Preparation

Two different solutions were prepared. Table 1 lists the chemicals that were used.

TABLE 1

| Substance | Chemical formula | Purity | Manufacturer |
|---|---|---|---|
| Lanthanum nitrate (hydrated) | $La(NO_3)_3 * 6\ H_2O$ | 99.99 | Rhône-Poulenc |
| Aluminium iso-propoxide | $Al(OC_3H_7)_3$ | >98 | Alfa |
| Nonylphenol ethoxylate (NP-5; trade name: Berol 02) | $C_7H_{19}C_6H_4(OCH_2CH_2)_6OH$ | Industrial grade | Akzo Nobel Surface Chemistry |
| Cyclohexane | $C_6H_{12}$ | >99 | J. T. Baker |
| Distilled water | $H_2O$ | — | — |

The first solution consisted of approximately 15 wt % aluminium iso-propoxide ($Al(OC_3H_7)_3$) dissolved in cyclohexane (solution 1). The dissolution may be aided by ultrasonic treatment.

The second solution was a w/o microemulsion (solution 2) prepared from two different solutions.

First, a solution of lanthanum nitrate ($La(NO_3)_3*6H_2O$) in distilled water was prepared. In order to obtain the hexaaluminate phase it is important that the molar La/Al ratio is exactly 1:11. The stoichiometric water/—$OC_3H_7$ molar ratio is 0.5, i.e. the corresponding water/aluminium iso-propoxide ratio is 1.5. In the examples 1, 2 and 3, the water/aluminium iso-propoxide ratio was 10, 50 and 100, respectively, times the stoichiometrically required amount. Hence, the concentration of lanthanum nitrate in the aqueous solution used in the different examples varied depending on the specific water/alkoxide ratio used.

A solution of 20 wt % NP-5 in cyclohexane was then prepared. By adding the aqueous solution of lanthanum nitrate to the surfactant-solvent solution, a microemulsion was obtained. The amount of aqueous phase in the microemulsion was always kept at 10 wt %.

Precipitation was accomplished by slowly adding the solution of aluminium isopropoxide in cyclohexane (solution 1) to the microemulsion (solution 2) under stirring. The mixture was aged under stirring for 48 h, during which hydrolysis and condensation took place. The ageing time may be increased or decreased.

Thereafter the precipitate was recovered by careful evaporation of the solvent in an oven at 75° C. in air. The boiling point of cyclohexane is 81° C. and this temperature must not be exceeded, as the solvent will start boiling violently.

Then the powder was calcined in air in a furnace. The temperature was increased at 2-5° C./min. The final temperature was chosen between 800 and 1200° C. and kept isothermal for 4 h.

The obtained calcined powders were characterised by X-ray diffraction (XRD) to determine the crystalline structure. Nitrogen adsorption-desorption at liquid nitrogen temperature according to the BET method was used to determine the specific surface area of the powders. The results are shown in Table 2.

TABLE 2

BET surface areas and crystal phases of prepared powders.
(calcination: 1200° C., 4 h; hydrolysis: 48 h;
surfactant system: NP5/cyclohexane)

| Ex. No | Water/ alkoxide ratio | BET surface (times area ($m^2$/g) stoich.) | Predominant phase* | crystal Minority crystal phase(s) |
|---|---|---|---|---|
| 1 | 10 | 32.9 | LHA | $LaAlO_3$ |
| 2 | 50 | 35.1 | LHA | $LaAlO_3$ |
| 3 | 100 | 23.0 | LHA | $LaAlO_3$ |

*LHA = Lanthanum hexaaluminate

EXAMPLE 4

The thermal stability of the LHA materials prepared by combined sol-gel and microemulsion techniques was tested and compared to those of conventionally co-precipitated LHA (co-precipitation of carbonates) and commercial alumina samples. The tests were carried out under extreme conditions, i.e. 1400° C. and 60% steam, to simulate conditions similar to those prevailing in a rocket engine. The surface areas were measured by BET and crystal phases were determined by XRD. The results are shown in FIG. 1.

It can be seen that most of the surface area is generally lost within the first few minutes. After 15 minutes, the decrease is much less dramatic. This is probably due to phase transitions in the materials, as well as rapid sintering of the smaller pores. After about 1 hour, the surface area is almost constant for up to 10 hours. The lanthanum hexaaluminate (LHA) sample prepared according to the invention exhibited a surface area of 19 $m^2$/g after 30 minutes. This should be compared to 11 $m^2$/g of the LHA catalyst prepared by conventional carbonate co-precipitation and 3 $m^2$/g of the commercial alumina sample.

The choice of surfactant-solvent system greatly influences the droplet size in the microemulsion and the water solubilisation capacity. The surfactant may be ionic or non-ionic, contain branched or straight hydrocarbon chains etc. The solvent is generally chosen to match the hydrophobic tails of the surfactant molecules. We chose to work with NP-5/cyclohexane systems. NP-5 is a non-ionic surfactant containing five oxy-ethylene groups in the hydrophilic head group and a nonylphenyl group as the hydrophobic tail. Although the aluminium iso-propoxide is readily dissolved in other solvents, it is important to choose one, which is compatible with the microemulsion (solution 2). Hence, cyclohexane was used in the examples. AOT/isooctane could also be used. However, the AOT molecule has two branched hydrophobic tails and hence, this system has a significantly lower water solubilisation capacity due to the bulky tail group. In addition, there were indications that AOT is more difficult to remove for powder recovery. AOT is a solid at ambient temperatures, while NP-5 is in the liquid state. It should be noted that a large variety of different surfactant-solvent systems might be used.

In the examples the amount of aqueous phase in the microemulsion was always kept at 10 wt % but may be decreased in order to obtain smaller water droplets. The water/surfactant ratio in the microemulsion determines the water droplet size and affects the final particle size of the precipitate. Although small water droplets are generally desired, the amounts of surfactant and solvent needed increase drastically when reducing the droplet size, e.g. by a factor ten when reducing the aqueous content from 10 to 1 wt % in a system with constant surfactant/solvent ratio. The composition of the microemulsion is also limited by the compositional region in which the w/o microemulsion phase is stable. As is well known to the person skilled in the art of w/o microemulsions each system has its individual ternary phase diagram, which must be taken into account.

The water/alkoxide ratio affects the nucleation process and the size of the precipitated particles. The stoichiometric ratio of water/aluminium iso-propoxide is 1.5, but ratios in excess of stoichiometry are generally used, as rapid precipitation, i.e. small particles, is desirable.

The ageing time will also affect the properties of the precipitated particles.

It is important to maintain the unique, discrete properties of the particles upon recovery. The final powder morphology is very much a result of the recovery step. There are several possible methods for recovery of the precipitate, which could be used, such as filtration, centrifugation, temperature induced phase separation, chemical destabilisation, evaporation of the solvent, supercritical drying and freeze drying. Although conceivable, centrifugation and filtration are not believed to be of any practical value, due to the extremely small particle size. The method of highest practical value is presently considered to be evaporation of the solvent.

Parameters such as atmosphere, heating rate, final temperature and duration of the calcination treatment all influence the properties of the final product.

Although described with reference to lanthanum hexaaluminate, other alkaline or rare earth metal hexaaluminates can also be prepared according to the invention, such as for example barium hexaaluminate.

Method for Obtaining Spherical Pellets of the Inventive Catalyst Material

Spherical pellets of a controllable, uniform size in the range of can suitably be prepared by means of the following method. By means of the method pellets of a desired diameter in the range of 0.2-5 mm can be obtained without the use of any conventional mould.

A slurry is prepared from the inventive catalyst material, a solvent, and any desired additives. Spheres are then formed by means of a drop-generating orifice to which said slurry is fed, and from which drop-generating orifice drops are released by means of a relative flow of a liquid medium. In said liquid medium the drops are formed into spherical bodies by the action of surface tension. The spherical bodies are thereafter treated for consolidation by a suitable method of direct casting.

The diameter of the pellets can be closely controlled primarily by regulating the relative flow rate of the liquid medium, and the feed pressure of the slurry.

As examples of desired additives which can be used in the slurry, the following can be mentioned: dispersants, defoamers, binders, fillers, consolidators, and processing aids etc.

When a particulate organic filler, such as in the form of fibres or particles, and/or a particulate consolidator is used in the slurry, the pellets prepared according to the present method will generally exhibit some residual porosity from the burn-out of the filler and/or consolidator used.

It is also conceivable to use a fibrous or particulate filler, optionally in addition to a consolidator, which filler can be removed by means of burn-out, in order to create pores, corresponding to the geometrical shape of the filler after burn-out thereof.

Accordingly, if desired, the amount of consolidator can be increased above the amount necessary for consolidation, in order to obtain open porosity in the pellets after burn-out of the consolidator. A filler which can be burned-out can also be used for the same purpose. The size of the pores can then be regulated by means of the particle size of the consolidator and/or filler.

In a preferred embodiment of the method, starch is used as consolidator.

The porous pellets thus formed of the sintering resistant material will maintain, or only slowly degrade in their desired area at a high temperature. The pellets will also maintain their geometry when subjected to high temperatures, also when exposed to relevant fluids, under such temperatures.

The slurry is fed through a small opening, such as the opening of a cannula, which opening enters into liquid medium. The force of the relative flow will cause a certain amount of slurry to separate from the opening, and be entailed by the flow.

In order to establish the action of surface tension, which is believed to be the principal driving force underlying the forcing of the released drops to assume a spherical shape, a liquid medium which is a poor solvent for the solvent of the slurry is preferably selected. This desired effect will be enhanced by selecting a medium which is immiscible with the solvent of the slurry. In any case, the liquid medium should be effective to force the released drops to minimise their surface area.

In the method, a relative flow of a liquid medium means that slurry enters into a flow of liquid medium, or into a stationary liquid medium, in which case the opening described a movement relative to the liquid medium is moved back and forth, or in a circle, for example, relative to the stationary medium.

The direction of the relative flow of the liquid medium is not critical and can vary from being coincidental with direction of formation of the drops, to essentially perpendicular to the direction of formation of the drops, the former of which is presently being preferred The spherical drops thus formed are then treated for consolidation, in accordance with the specific consolidation method used, drying, burn-out of any filler and/or consolidator used, and sintering.

By performing the sintering step under pressure-less conditions, i.e. without the use of a mould, the pellets will exhibit a macro-porosity depending on the specific consolidator and/or filler used, and more particularly the particle size and shape thereof.

For a given slurry and given diameter of the opening, the size of the pellets can be closely controlled by regulating the relative flow rate of the liquid medium, and the feed pressure of the slurry. Other factors that will affect the pellet sizes obtainable are primarily the viscosity of the slurry, the density of the slurry, and the diameter of the opening.

Any suitable consolidator can be used in the present method. The consolidator will of course be dependent on the desired method of consolidation. Suitable consolidators and consolidation methods, respectively, are;
starch—starch consolidation,
protein—protein coagulation,
polymer—gel casting (from monomers, or polymers which are cross-linked, and
solvent of the slurry—freezing.

The term direct casting as used in connection with the method is generally defined as the process of transforming an amount of slurry into a rigid body, and is intended to embrace such methods wherein a consolidator is used. The terms direct casting and consolidation will be used interchangeably.

Suitably examples of direct casting method are described by Wolfgang M. Sigmund et al in "Novel Powder-Processing Methods for Advanced Ceramics", *J Am Ceram Soc,* 83 [7] 1557-74 (2000), which is incorporated by reference herein in its entirety For the purpose of regulating the size of the pores resulting from burn-out in the pellets, starch is very suitable, and can also perform the function of a consolidator. The average size of the starch particles generally ranges from 2-100 μm depending on from which plant the starch is derived.

Thus, for example, the consolidating amount of starch could be of one size, and additional starch particles added in order to obtain an open porosity could be of another size. It is also conceivable that suitable starch addition will reduce the density of the obtained pellets without accomplishing an open continuous porous structure The design of the apparatus used to form the drops or droplets is not critical, and can be of any design as long as drops can be produced. In the method, apparatus according to the following can be used, for example. A suitable apparatus in its most simple embodiment can be based on the following general components. An opening, such as the opening of a cannula or tube, at which drops are released or ejected. The drops are then forced to separate from the opening by means of the flow of a liquid medium acting on the ejected slurry.

Figure 2:
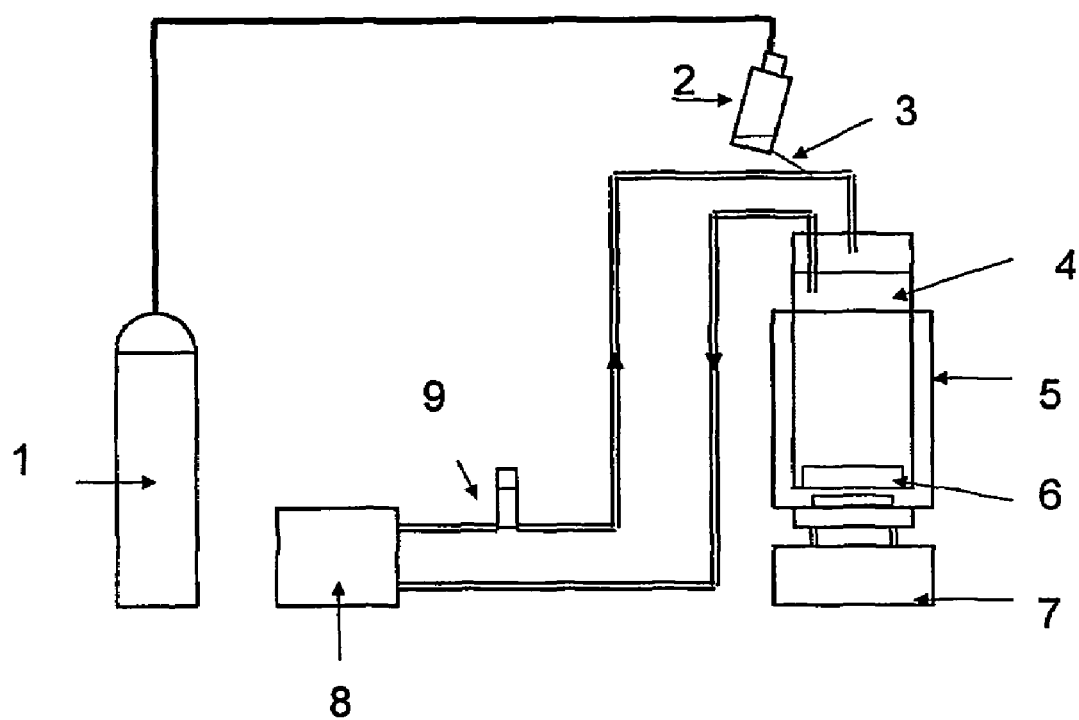
FIG. 2 illustrates a principal set-up of an apparatus for forming spherical pellets of the present sintering resistant catalyst material obtained according to the method of the invention.

With reference to FIG. 2, an example of a suitable set-up of the apparatus for the forming of spherical pellets is illustrated, wherein 2 is a container with water-based slurry, 1 is a vessel containing pressurised gas for pressurising the slurry container, 3 is a cannula, 4 is a glass beaker containing organic liquid medium, 5 is a container with medium for regulating the temperature of the organic liquid, 6 is a sieve for collecting the pellets, 7 represents a magnet stirrer and heater, 8 is a peristaltic pump, and 9 is a flow equaliser.

It is preferred that the drops formed be subjected to heat as soon as possible after formation in order to consolidate the drops. This can be done by discharging the drops from the apparatus directly into a suitable medium for consolidation. In for example the case of polymers, starch and protein requiring heating for consolidation, the medium, such as a liquid, is heated to consolidation temperature. Other means of heating the drops are of course also possible, such as a heated gas medium or microwave radiation. In order to obtain spherical droplets, the droplets must have enough time to become spherical, by the force of surface tension, before the solidification temperature is reached in the droplets, as this will lock the current geometry.

In the case of consolidation by means of freezing of the solvent of the slurry, a cold medium is used.

After consolidation, the pellets are preferably dried before any burn-out of consolidator and/or filler, in order to prevent disintegration of the pellets during the burnout, due to rapid build up of any vapour inside the bodies.

It is often desirable that the catalyst pellets exhibit an as great as possible specific surface area, in order to maximise the catalytic surface area accessible to the reaction to be catalysed. Therefore, it is of a great advantage to use the high sintering resistance material of prepared according to the method of present invention. Since the powder has a narrow particle size distribution, pellets having a fine (sub-micron range) porosity is obtained, such as for example in the range of 100-200 nm. By using a higher amount of consolidator in the slurry than necessary for consolidation, an open macro-porous structure can be obtained, formed by the pores resulting from burned-out particles of consolidator and/or filler in the pellets. Thereby, an increased fraction of the nano-porous structure will be available to catalysis, and thus the pellets will exhibit a substantially increased effective catalytic surface area.

Such an open porosity will also reduce the flow resistance posed by the pellets, when contained in a catalytic bed for example. Also, the risk for vapour induced disintegration of the pellets could be reduced, since any vapour formed in the pores by liquid that has penetrated into the pellet more easily can escape from the structure by means of an open porosity.

By means of varying the amount of consolidator (or filler which can be burned-out), and thereby the extent of the open porosity, pellets can be prepared offering a controlled pressure resistance, when contained in a catalyst bed for example.

According to a preferred embodiment of the method of the present invention, drops are formed from a slurry containing ceramic powder, starch as the consolidator, optionally a dispersant, and water, which drops thereafter are heated for swelling of the starch, such as, for example, by being heated in a liquid medium. The slurry can also contain other organic constituents and solvents or dispersing media or liquids, as long as an amount of water sufficient for effecting swelling is present. Naturally, a liquid medium for the forming of the spheres must be selected that does not disturb the function of the constituents of the slurry.

During heating to elevated temperatures, the starch granules will absorb water from the slurry and swell, thereby forming rigid bodies, which can be collected and dried. During the swelling, the consolidated bodies are preferably allowed to consolidate (solidify) freely, i.e. without the use of a mould. The dried bodies are thereafter heated at higher temperatures in order to remove the starch through a burn-out, and finally sintered at even higher temperatures to achieve a material with sufficient strength and hardness. The macro-porosity remaining in the material after sintering will generally correspond to the amount and type of starch pellets used in the slurry, and the ability of the ceramic matrix to densify.

The shape, size and swelling temperature of the starch granules depends on the specific starch type. Among the most common starches for commercial uses, potato starch swell at 50-55° C., corn and rice starch at 60-75° C. Examples of other varieties of starch which can be used in the invention are those obtained from the seeds of cereal grains, such as sorghum and wheat, also from certain roots, such as tapioca, cassaya and arrowroot, and from the pitch of the sago palm. The mean granule size is 55 µm for potato starch, 10-15 µm for corn starch and 5 µm for rice starch. The size of the starch used is not critical and can be selected based on the specific purpose and the desired size of the pores. The starch can be in native form or in chemical modified form. For example, the starch can be modified by etherification to make it more stable towards mechanical treatment and acidic conditions.

In a bed of catalytic material used in for example a rocket engine, the flow a fluid through such bed must not be overly inhibited, while still offering a certain flow resistance. That is, the flow resistance offered by such catalytic bed must be regulated within certain limits. Further, the material must also exhibit a high specific surface area, which should be maintained during use the under harsh conditions encountered in a rocket engine.

EXAMPLE 5

Preparation of spheres from a slurry containing an amount of starch effective for consolidation of the drops.

The constituents used in the example are listed below:

| Constituent | Designation/Manufacturer | Percentage |
|---|---|---|
| Hexaaluminate powder | $LaAl_{11}O_{18}$ | 30 vol % (solids content) |
| Dispersant | Duramax D-3021/ Rohm and Haas France S.A., France | 1.0% by weight based on powder |
| Liquid | Distilled vatten | Balance |
| Starch | Mikrolys 54, 1.43 g/cm$^3$/ Lyckeby Stärkelse AB, Sweden | 5% by vol. based on powder |

The hexaaluminate powders obtained in Examles 1-3 were used in this example.

The powder was amorphous and had a very fine particle size and exhibited a specific surface area of 280 m$^2$/g. However, using such a fine powder, slurries of sufficiently high solids content are difficult to reach. Therefore, the powder was additionally calcinated at 1200° C. during 4 hours in air. At this temperature the powder is transformed into a crystalline phase and the specific surface area is reduced to 30-35 m$^2$/g.

A slurry was prepared based on the constituents enumerated above. Thereafter the slurry obtained was forced into a cannula with an inner diameter of 0.3 mm, which was inserted into a polyethylene tube with an inner diameter of 3.5 mm. The liquid heating medium was circulating in the polyethylene tube and the flow forced the drops to be released (at a premature stage) from the opening of the cannula. By merely changing the flow velocity of the liquid heating medium, the size of the drops could readily be varied between 0.5 and 1.5 mm. The liquid heating medium used, in which the spheres are consolidated, was liquid paraffin (KeboLab, item No. 13647-5), and was kept at an elevated temperature of 60-70° C.

The consolidated pellets were collected and dried in air at about 50° C. Thereafter the spheres were sintered at 1200, 1300 and 1400° C., respectively, for 30 minutes in air. The heating ramps used were 1° C./min up to 500° C. and 5° C./min up to the sintering temperatures.

The pellets obtained after sintering were spherical, and exhibited a very smooth surface, and a high side crush strength. The porosity was found to be binomial, with the larger pores resulting from the consolidator particles, and the finer porous structure, 100-200 nm, resulting from the specific ceramic powder used. The pellets were found to be sintering resistant up to temperature of at least 1700° C. That is, the surface area declined insignificantly during prolonged exposure to this temperature.

The invention claimed is:

1. Method of preparation of high-temperature stable hexaaluminates, $AAl_{11}O_{18}$, wherein A is an alkaline earth or rare earth metal, having improved sintering resistance, characterised in that a solution of an aluminium alkoxide is added to a water-in-oil microemulsion, the aqueous phase of which comprises a solution of a water soluble salt of A, whereafter powder formed is recovered and calcined.

2. Method according to claim 1, characterised in that the water soluble salt of A is a nitrate, chloride, or acetate.

3. The method of claim 2, wherein said water soluble salt of A is a nitrate.

4. Method according to claim 2, characterised in that A is La.

5. Method according to claim 4, characterised in that a part of the aluminium alkoxide is substituted by an equimolar amount of a water soluble salt of Mn.

6. Method according to claim 5, characterised in that the powder formed is recovered by evaporation of the solvent.

7. Method according to claim 6, characterised in that the recovered powder is calcined at 800-1200° C. for obtaining the hexaaluminate structure.

8. Method according to claim 1, characterised in that A is La.

9. Method according to claim 1, characterised in that a part of the aluminium alkoxide is substituted by an equimolar amount of a water soluble salt of Mn.

10. The method of claim 9, wherein said water soluble salt of Mn is a nitrate.

11. Method according to claim 1, characterised in that the powder formed is recovered by evaporation of the solvent.

12. Method according to claim 1, characterised in that the recovered powder is calcined at 800-1200° C. for obtaining the hexaaluminate structure.

13. Shaped bodies formed of a hexaaluminate, $LaAl_{11}O_{18}$, obtained by the method of claim 1.

14. Method of preparing spherical pellets of a diameter of 0.2-5 mm from a high temperature stable hexaaluminate, $AAl_{11}O_{18}$, obtained by the method of claim 1, wherein drops are generated from a slurry comprising the hexaaluminate, a solvent, and optionally additives selected from the group consisting of dispersants, defoamers, binders, fillers, consolidators and processing aids, by a drop-generating orifice to which said slurry is fed, which drops are released from said orifice by a relative flow of a liquid medium, formed into spherical bodies in said liquid medium by action of surface tension, and treated for consolidation.

15. High-temperature stable hexaaluminate, $AAl_{11}O_{18}$, wherein A is La, exhibiting improved sintering resistance, obtainable by the method of claim 7.

16. High-temperature stable hexaaluminate, $LaAl_{11}O_{18}$, having improved sintering resistance, formed as a recovered powder from a solution of aluminum alkoxide in a water-in-oil microemulsion, the aqueous phase of said microemulsion comprising a solution of a water soluble salt of La, the recovered powder having been calcined at 800-1200° C., and exhibiting about 10 $m^2/g$ BET surface area after ageing in 60% steam at 1400° C. for 2 hours.

* * * * *